United States Patent
Pifferi

[11] 3,928,325
[45] Dec. 23, 1975

[54] ALPHA-HYDRAZINOBENZYLPENICILLINS

[75] Inventor: Giorgio Pifferi, Milan, Italy

[73] Assignee: I.S.F. S.p.A., Milan, Italy

[22] Filed: Nov. 5, 1973

[21] Appl. No.: 412,535

[30] Foreign Application Priority Data
Nov. 10, 1972  Italy .................................. 31558/72
May 15, 1973  Italy .................................. 24127/72

[52] U.S. Cl. .............................. 260/239.1; 424/271
[51] Int. Cl.² .................................... C07D 499/44
[58] Field of Search .............................. 260/239.1

[56] References Cited
UNITED STATES PATENTS
3,697,507  10/1972  Frederiksen et al. ............ 260/239.1

*Primary Examiner*—Nicholas S. Rizzo
*Attorney, Agent, or Firm*—Hubbell, Cohen & Stiefel

[57] ABSTRACT

A new class of semisynthetic penicillins of the formula:

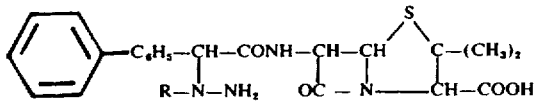

wherein R is H or a $C_1$–$C_6$ alkyl group.

11 Claims, No Drawings

ALPHA-HYDRAZINOBENZYLPENICILLINS

The present invention relates to a series of novel semisynthetic penicillins of the formula:

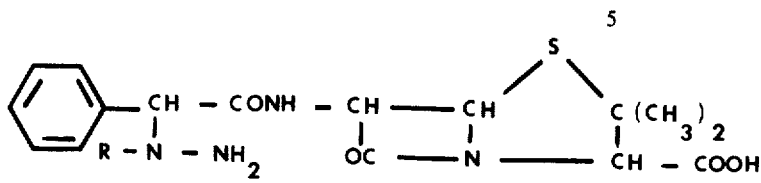

wherein R is hydrogen or a straight or branched chain lower alkyl group having 1 to 6 carbon atoms and to a process for the preparation thereof.

The invention includes the above described hydrazinobenzylpenicillins in the form either of racemates or enantiomers as well as non-toxic salts thereof, particularly, the sodium, potassium, calcium and ammonium salts, salts thereof with non-toxic amines such as triethylamine, procaine, dibenzylamine, N,N¹-dibenzylethylendiamine and other amines conventionally used to form salts with benzylpenicillin and to non-toxic acid addition salts thereof with mineral acids such as hydrochloric acid, hydrobromic acid, hydroiodic acid, sulphuric acid, phosphoric acid or with organic acids such as acetic acid, succinic acid, maleic acid, citric acid, benzoic acid, tartaric acid, ascorbic acid and the like.

The present invention also includes readily hydrolyzable esters of the novel penicillins which are converted to the free acid(I) by mild chemical or enzymatic hydrolysis.

According to the present invention, the process for the preparation of the new penicillins of the formula (I) comprises condensing 6-aminopenicillanic acid (6-APA), either as such, or as a salt thereof, or preferably in the form of labile trimethylsilanic ester, with a derivative of α-hydrazino-phenylacetic acid of the formula (II):

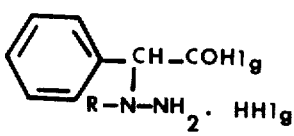 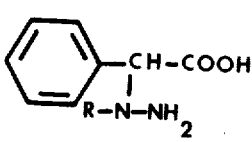

(II)                              (III)

wherein Hlg is chlorine or bromine and R is as defined above. The halo-acid salts of the acid halides of the formula (II) are novel compounds and are prepared in two steps by reacting an α-chloro- or α-bromophenylacetic acid with the suitable monoalkylhydrazines R—NHNH₂, thus obtaining compounds of the formula (III), which are also novel except in the case where R=H. The hydrochlorides (or hydrobromides) of the hydrazino acids (III) when treated at low temperature in the absence of humidity with strong halogenating agents such as phosphorus pentachloride or pentabromide, yield the corresponding compounds of formula (II).

In a preferred embodiment, the synthesis method utilizes the well known "silanic protection" of 6-APA. According to this technique, 6-APA is treated with a suitable mono- or poly-halosilanic derivative, followed by reacting the obtained product with a compound of formula (II). As an alternative to using a poly-halosilanic compound such as hexamethyldisilazane, monofunctional sililating agents may be used such as trimethylchlorosilane, triethylbromosilane, tri-n-butylchlorosilane, as well as the multifunctional sililating agents such as dimethyldichlorosilane and dimethyldibromosilane.

According to a further aspect of the present invention the compounds of formula (I) can also be prepared according to the standard procedures conventionally used in peptide syntheses, including those techniques which employ "protection" of the amino function (in this case the protection of the hydrazino function), the subsequent reaction with 6-APA a mixed anhydride reaction and the hydrogenolytic or hydrolytic elimination of the protective group, according to the scheme represented as follows:

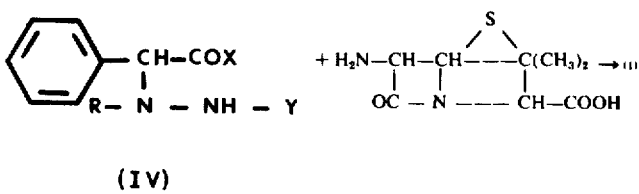

(IV)

wherein

X is a —O—CO—OC₂H₅, imidazolyl, or 2,4-dinitrophenoxy group and the like.

Y is a carbobenzyloxy, —COCCl₃ or trimethylsiloxanyl group and the like, and R is as defined above.

The synthesis of compounds of formula (I) utilizes the condensation of equimolecular quantities of compounds of the formula (II) and 6-APA, preferably in protected form, carried out in an aprotic solvent, preferably, polyhalogenated hydrocarbons such as methylene chloride and alcohol-free chloroform. Since some of the penicillins of the present invention are substances which tend to degrade with subsequent loss of antibiotic activity, mild reaction conditions are preferred in order to avoid possible decomposition thereof. The temperature selected for the process of the present invention should not, for example, exceed 50°C and the initial condensation step is often carried out at low temperature such as −5° to 0°C.

An important and unexpected aspect of the present invention concerns the use, as an acceptor for halogenhydric acids of an equivalent of sodium bicarbonate which, under the reaction conditions applied, does not alter the salification of the hydrazino group (II) even though it blocks the hydrochloric (or hydrobromic) acid obtained in the condensation of compounds of formula (II) with 6-APA. As an alternative, an equivalent of dimethylaniline containing small quantities (5–10%) of the corresponding hydrochloride may also be used.

When the condensation is complete, penicillins of the formula (I) are desilinized by simply adding water to the organic layer. In the case of conventional protections, for example with a carbobenzyloxy group, the simple hydrolytic treatment is replaced with a hydrogenolytic treatment. The isolation of derivatives of the formula (I), owing to their remarkable water-solubility, is carried out by evaporating the acid-aqueous layer in vacuo and at low temperature, after adjusting the pH to the isoelectric point (approx. pH 4.7) by adding a suitable quantity of a dilute alkali hydroxide. The dry residue is extracted with a protic solvent, preferably ethanol, after which the alcoholic extract is concentrated and cooled until the penicillin derivative begins to crystallize.

The separation into the corresponding enantiomers is carried out according to the conventional organic chemical methods, for example by preparing and separating the diastereoisomer salts with optically active bases or acids. These diastereoisomers can in fact be prepared starting from the optically active forms of α-hydrazino- or α-(1-alkylhydrazino)-phenylacetic acid, obtained by suitable hydrazinolysis of the optically active α-halophenylacetic acids of the opposite sign (Darapsky, J.p.r. (2) 99, 217 (1919); Seidler et al. Ann., 501, 207 (1933). The optically active α-hydrazino- or α-(1-alkylhydrazino)-phenylacetic acids are subsequently transformed into the optically active forms of the corresponding chloride-hydrochlorides from which the R(−) and S(+) forms of the compounds of formula I are obtained.

The compounds of the present invention may be used in therapy as such or mixed with conventional pharmaceutical excipients.

The following examples serve to illustrate the invention without limiting it.

EXAMPLE 1

6-[D,L-α-(1-Methylhydrazino)-phenylacetamido]-penicillanic acid

Procedure a.

Preparation of the acid chloride of D,L-α-(1-methylhydrazino)-phenylacetic acid hydrochloride.

100 g of D,L-α-bromophenylacetic acid dissolved in 200 ml of methylene chloride are added at 0°/+5°C to a solution of 43 g of anhydrous methylhydrazine in 400 ml of methylene chloride. The mixture is stirred for one hour at 0°/+5°C; the crystalline precipitate is collected in vacuo, washed with 300 ml of cold water, and crystallized while damp from 1200 ml of water. 56 g of D,L-α-(1-methylhydrazino)-phenylacetic acid melting at 220°–222°C are obtained. A stream of hydrogen chloride is bubbled for approximately 1 hour into a suspension of 30 g of D,L-α-(1-methylhydrazino)-phenylacetic acid in 550 ml of anhydrous methylene chloride cooled to −30°C; then 49 g of phosphorus pentachloride are rapidly added. The mixture is stirred for 15 minutes at −30°C, the temperature is allowed to rise to 0°C and after 1 hour at such temperature, it is stirred for 3 hours at room temperature. 20 g of the acid chloride of D,L-α-(1-methyl-hydrazino)-phenylacetic acid hydrochloride melting at 105°–110°C (with dec.) are collected under vacuo.

0.61 g of hexamethyldisilazane is added under stirring at room temperature and under a nitrogen atmosphere to a suspension of 1.01 g of 6-aminopenicillanic acid in 10 ml of anhydrous methylene chloride. The mixture is refluxed until the evolution of ammonia is complete. The opalescent solution is cooled to 0°C and 0.4 g of sodium bicarbonate are rapidly added followed by 1.12 g of the acid chloride of D,L-α-(1-methylhydrazino)-phenylacetic acid hydrochloride. The suspension is maintained under stirring at 2°–4°C for 2 hours, then for 30 minutes at 10°–12°C, then it is cooled to 0°C and 8 ml of water are added, maintaining it under stirring at 10°C for 20 minutes. The two layers are separated, the aqueous layer adjusted to pH 4.7 with a cold dilute solution of sodium hydroxide, evaporated in vacuo at low temperature to dryness. The residue is further taken up with 20 ml of ethanol, separated from insoluble mineral salts and subsequently concentrated in vacuo to give 0.45 g of 6-[D,L-α-(1-methylhydrazino)-phenyl-acetamido]-penicillanic acid melting at 210°–215°C (with dec) obtained melting at 217°–220°C (with dec.).

Procedure b.

Preparation of D,L-α-(1-methyl-2-benzyloxycarbonylhydrazino)-phenylacetic acid 31.5 g of D,L-α-(1-methylhydrazino)-phenylacetic acid are added under stirring and at room temperature to a solution of 11.65 g of sodium carbonate in 840 ml of water and when dissolution is complete, 840 ml of dioxane are further added. The mixture is cooled to 10°C and a solution of 31.5 g of benzyl chloroformate dissolved in 315 ml of dioxane are added slowly, buffering the acidity developed by adding 19.5 g of sodium bicarbonate dissolved in 315 ml of water. The solution is stirred for two hours at room temperature and subsequently heated for 30 minutes at 50°C. It is then concentrated in vacuo until dry and the residue, taken up with 800 ml of water is extracted with diethylether which is then discarded, while the aqueous layer, cooled to 0°C, is acidified with a dilute solution of hydrochloric acid. The oil which separated was extracted with chloroform. By evaporating the chloroform to dryness under vacuo and crystallizing the residue, 40 g of D,L-α-methyl-2-benzyloxycarbonylhydrazino phenylacetic acid, melting at 96°–97°C are obtained.

2.32 g of ethyl chloroformate are added to a solution of 6 g of D,L-α-(1-methyl-2-benzyloxycarbonylhydrazino)-phenylacetic acid and 2.17 g of triethylamine in 120 ml of acetone cooled to 0°C. The mixture is stirred for 20 minutes at −5°C adding a solution of 4.16 g of 6-aminopenicillanic acid in 115 ml of 4% sodium bicarbonate. The reaction mixture is kept stirred for 30 minutes at 0°C and subsequently for another 30 minutes at room temperature. The temperature is lowered to 0°C and the reaction mass extracted twice with 200 ml of diethyl ether which is discarded. The aqueous layer is acidified under cool conditions with 10% hydrochloric acid to pH 2 and extracted three times with 100 ml portions each of diethyl ether. The ethereal extracts are collected and washed with cold water; the carbobenzyloxy-derivative of α-(1-methylhydrazino)-benzylpenicillin is extracted with an aqueous solution of 4% sodium bicarbonate until the pH of the aqueous layer reached 6.2. The limpid aqueous solution is hydrogenated under atmospheric pressure and room temperature in the presence of 3 g of 10% Pd over charcoal until complete development of carbon dioxide. The catalyst is removed by filtration, the solution is cooled to 0°C and adjusted to pH 2 with 10% hydrochloric acid. The solution is extracted with diethyl ether and the aqueous layer treated with a saturated solution of sodium bicarbonate until a pH of 4.7 is reached. The aqueous layer is evaporated in vacuo at low temperature, the residue is taken up with ethanol, the insoluble mineral salts removed by filtration; by dilution with diethyl ether of the filtrate, 5.15 g of 6-[D,L-α-(1-methylhydrazino)-phenylacetamido]-penicillanic acid melting at 212°–217°C are obtained.

EXAMPLE 2

6-(D,L-α-Hydrazinophenylacetamido)-penicillanic acid

Preparation of the acid chloride of D,L-α-hydrazinophenylacetic acid hydrochloride.

A stream of hydrogen chloride is bubbled for approximately 1 hour into a suspension of 60 g of D,L-α-hydrazinophenylacetic acid in 1100 ml of anhydrous methylene chloride cooled to −30°C.

109.5 g of phosphorus pentachloride are then rapidly added to the mixture, maintaining it under stirring at −30°C for 15 minutes. The temperature is then raised to 0°C maintaining it thereat for 1 hour and the suspension is finally stirred for 3 hours at room temperature. The crystals are rapidly collected in vacuo and repeatedly washed on a filter with anhydrous methylene chloride. After drying in vacuo at room temperature over calcium chloride, 40 g of the acid chloride of D,L-α-hydrazinophenylacetic acid hydrochloride is obtained melting at 144°–148°C (with dec.).

3.04 g of hexamethyldisilazane are added under stirring at room temperature in nitrogen atmosphere to a suspension of 5 g of 6-aminopenicillanic acid in 50 ml of anhydrous methylene chloride.

The mixture is refluxed until evolution of ammonia is complete. The opalescent solution is cooled to 0°C and 1.99 g of sodium bicarbonate are rapidly added, followed by 5.22 g of the acid chloride of D,L-α-hydrazinophenylacetic acid hydrochloride. The suspension is maintained under stirring at 0°–4°C for 2 hours, then for a further 30 minutes at 10°–15°C. The suspension is then cooled to 0°C and 37 ml of water are added maintaining the mixture under stirring at 10°C for 20 minutes. The aqueous layer is then separated, the pH adjusted to 4.7 with a dilute solution of sodium hydroxide and concentrating under high vacuum at low temperature to a small volume. 0.62 g of 6-(D,L-α-hydrazino-phenylacetamido) penicillanic acid are obtained melting at 217°–220°C (with dec.).

EXAMPLE 3

6-[D,L-α-(1-Ethylhydrazino)-phenylacetamido]-penicillanic acid

Preparation of D,L-α-(1-ethylhydrazino)phenylacetic acid chloride hydrochloride.

101 g of ethylhydrazine dihydrochloride are portionwise added to a cool suspension of 82.1 g of sodium methylate in 1200 ml of anhydrous methylene chloride. The suspension is stirred at 0°C for 30 minutes, then a further 30 minutes at room temperature and finally refluxed for 1 hour; the mixture is cooled to 0°C and 81.3 g of D,L-α-bromophenylacetic acid dissolved in 330 ml of methylene chloride are added thereto. Stirring is continued at 0°C for 15 minutes, then for 45 minutes at room temperature and subsequently refluxed for 1 hour. The mixture is cooled, filtered in vacuo and the crystals washed with hot ethanol and crystallized from water.

34.5 g of D,L-α-(1-ethylhydrazino)-phenylacetic acid melting at 226°–227°C (with dec.) are obtained. A stream of hydrogen chloride is bubbled for 1 hour into a suspension of 15 g of D,L-α-(1-ethylhydrazino)-phenylacetic acid in 270 ml of anhydrous methylene chloride cooled to −30°C. Keeping the solution at −30°C, 22.9 g of phosphorus pentachloride are added thereto.

The mixture is kept under stirring at −30°C for 15 minutes, after which the temperature is raised to room temperature and the solution stirred for 3 hours at that temperature.

Filtration in vacuo gives 7.7 g of the acid chloride of D,L-α-(1-ethylhydrazino)-phenylacetic acid hydrochloride melting at 80°–85°C (with dec.).

To a suspension of 2 g of 6-aminopenicillanic acid in 20 ml of anhydrous methylene chloride, 1.21 g of hexamethyldisilazane are added under stirring at room temperature under a nitrogen atmosphere. The mixture is refluxed until evolution of the ammonia is complete. The opalescent solution is cooled to 0°C, 0.79 g of sodium bicarbonate is rapidly added and immediately after, 2.34 g of the acid chloride of D,L-α-(1-ethylhydrazino)-phenylacetic acid hydrochloride is added. The suspension is kept under stirring at 2°–4°C for 2 hours, then for further 30 minutes at 10°–12°C. It is successively cooled to 0°C, and 16 ml of water are added. The two layers are separated; the aqueous layer is adjusted to pH 4.7 by addition of a dilute, cold solution of sodium hydroxide, then evaporated. The residue is taken up with ethanol and by concentrating in vacuo, 0.8 g of 6-[D,L-α-(1-ethylhydrazino)phenylacetamido] penicillanic acid melting at 195°–200°C (with dec.) are obtained.

EXAMPLE 4

6-[D,L-α-(1-n-Propylhydrazino)-phenylacetamido]-penicillanic acid

This example was carried out as previously described starting from the acid chloride of D,L-α-(1-n-propylhydrazino)-phenylacetic acid hydrochloride melting at 76°–90°C obtained from D,L-α-(1-n-propylhydrazino)-phenylacetic acid melting at 230°–234°C (with dec.). 6-[D,L-α-(1-n-Propylhydrazino)phenylacetamido]-penicillanic acid melting at 205°–209°C was obtained.

EXAMPLE 5

6-[D,L-α-(1-n-Pentylhydrazino)-phenylacetamido]-penicillanic acid

Preparation of D,L-α-(2-benzyloxycarbonyl-1-n-pentylhydrazino)-phenylacetic acid sodium salt.

A mixture consisting of 10 g of α-bromophenyl acetic acid and 22 g of 1-n-pentyl-2-benzyloxycarbonyl-hydrazine is heated on a water-bath to 95°–100°C under slow stirring for a period of 2 hours and 30 mins. Then it is cooled to room temperature and the obtained oil, is taken up with 200 ml of sodium bicarbonate, stirred at room temperature for one hour, extracted twice with ethyl ether, washed with water and concentrated in vacuo to dryness. The bicarbonate layer is cooled to 0°C, acidified with a 20% hydrochloric acid solution, the oil which separates extracted with ethyl ether, washed with cold water until a neutral pH is obtained, dried over sodium sulphate, filtered, and dried in vacuo to obtain an oily residue. The residue is taken up with 600 ml of acetone and treated with 46 ml of a 1N methyl isobutyl ketone sodium ethylhexanoate solution. Then it is filtered, washed thoroughly with acetone, dried in vacuo at 40°–50°C over phosphorus pentoxide to obtain 9.5 g of D,L-α-(2-benzyloxycarbonyl-1-n-pentylhydrazino)-phenylacetic acid sodium salt melting at 226°–228°C (with dec.).

A mixture of 2.55 g of ethylchlorocarbonate in 25 ml of anhydrous acetone is added to a mixture of 8 g of D,L-α-(2-benzyloxycarbonyl-1-n-pentylhydrazino)-phenylacetic acid sodium salt in 300 ml of anhydrous acetone cooled to 0°C. After stirring for 3 hours at room temperature, the mixture is cooled to 0°C and a precooled solution of 4.42 g of 6-amino-penicillanic acid in 124 ml of 4% sodium bicarbonate is then added. The mixture is stirred for 30 minutes at 0°C and for 30 minutes at room temperature. It is then extracted with ether and the mother liquors are acidified with dilute hydrochloric acid to pH 2, extracting with ether the oil which separates. The organic extract is washed with cold water, dried over magnesium sulphate and a solution of approximately 1N sodium ethylexanoate in methyl-isobutylketone is added thereto. The precipitate is collected in vacuo, washed with ether and dried in vacuo at room temperature to obtain 6.4 g of 6-[D,L-α-(2-benzyloxycarbonyl-1-n-pentylhydrazino)-phenylacetamido]-penicillanic acid sodium salt melting at 170°–178°C (with dec.). 2.2 g of 10% palladium over charcoal are added to a solution of 3 g 6-[D,L-α-(2-benzyloxycarbonyl-1-n-pentylhydrazino)-phenylacetamido]-penicillanic acid sodium salt in 30 ml of water at normal pressure and room temperature until the evolution of carbon dioxide is completed. The catalyst is removed by filtration, cooled to 0°C and acidified to pH 2 with dilute hydrochloric acid, extracted with ether and the mother liquors are adjusted to pH 4.7 with 10% sodium hydroxide, concentrated in vacuo to dryness at a temperature not exceeding 30°C to obtain 2.1 g of raw 6-[D,L-α-(1-n-pentylhydrazino-phenylacetamido]-penicillanic acid when recrystallized melts at 210°–214°C.

EXAMPLE 6

6-(R(−)-α-hydrazinophenylacetamido)penicillanic acid

Preparation of the acid chloride of R(−)-α-hydrazinophenylacetic acid hydrochloride A solution of 8.08 g of S(+)-α-chlorophenylacetic acid in 22 ml of methylene chloride is dripped into a solution of 4.97 g of hydrazine hydrate in 50 ml of methylene chloride, cooling to 0°–5°C. The mixture is then slowly warmed to 40°C and refluxed for 1 hour. It is subsequently cooled to 0°C for 2 hours and the white precipitate obtained is filtered and dried in vacuo. The raw R(−)-α-hydrazinophenylacetic acid is purified by crystallization from water; melting point 181°–183°C. The hydrazinoacid is suspended in 65 ml of methylene chloride, cooled to −40°C and hydrogen chloride is bubbled for 1 hour into the stirred mixture. 6.35 g of phosphorus pentachloride are added, maintaining the same temperature for 1 hour; then the mixture is warmed to 0°C thus obtaining a white precipitate which is rapidly filtered, washed with methylene chloride and filtered again to give, after drying in vacuo, 4.1 g of chloride of the acid R(−)-α-hydrazinophenylacetic acid hydrochloride, melting at 147°–153°C (with dec.).

0.42 ml of hexamethyldisilazane are added to a suspension of 629 mg of 6-aminopenicillanic acid in 7 ml of methylene chloride. The mixture is refluxed for 4 hours, cooled to 10°C and 0.42 ml of N,N-dimethylaniline added thereto. Then it is cooled to −8°C and 670 mg of the acid chloride of R(−)-α-hydrazinophenylacetic acid hydrochloride are added portionwise thereto. The temperature is raised to 10°C gradually in one hour; the mixture is then maintained at room temperature for a further hour, subsequently cooled to 0°C and 5 ml of water are added. The layers are separated and the pH adjusted to 4.5 by adding a suitable quantity of 10% sodium hydroxide. By cooling the mixture to 0°C a white precipitate is obtained which is filtered, washed with water and dried in vacuo at room temperature, in the presence of potassium hydroxide. The product is thoroughly washed with methylene chloride, filtered again and dried under vacuo to obtain 300 mg of 6-R(−)-α-hydrazinophenylacetamido penicillanic acid melting at 190°–195°C (with dec.).

EXAMPLE 7

6-(S(+)-α-hydrazinophenylacetamido)penicillanic acid

Preparation of the acid chloride of S(+)-α-hydrazinophenylacetic acid hydrochloride A solution of 13.7 g of R(−)-α-chlorophenylacetic acid in 37 ml of methylene chloride is dripped into a solution of 8.6 g of hydrazine hydrate in 85 ml of methylene chloride maintaining the temperature at 0°–5°C. The mixture is then slowly warmed to 40°C, the refluxed for 1 hour. It is subsequently cooled to 0°C for 2 hours; the white precipitate is filtered and dried in vacuo. The raw S(+)-α-hydrazinophenylacetic acid is purified by crystallization from water, melting at 187°–189°C. The hydrazinoacid is suspended in 150 ml of methylene chloride, cooled to −40°C and a stream of hydrogen chloride is bubbled into the mixture under stirring for 1 hour. The same temperature being maintained, 14.4 g of phosphorus pentachloride are added thereto and then the mixture warmed up to 0°C; a white precipitate forms which is rapidly filtered, washed thoroughly with methylene chloride, filtered again and dried in vacuo to obtain 6.9 g of the acid chloride of S(+)-α-hydrazinophenylacetic acid hydrochloride melting at 143°–145°C. The procedure is carried out as previously described starting from 6-aminopenicillanic acid suitably silinized and the acid chloride of S(+)-α-hydrazinophenylacetic acid hydrochloride. 6-(S(+)-α-hydrazinophenylacetamido)penicillanic diastereoisomer is obtained in a 67% yield, melting at 186°–190°C. According to a further aspect of the invention, the new penicillins according to the invention are useful in chemotherapy, these compounds being endowed with powerful antibacterial action against Gram-positive and Gram-negative bacteria with a high degree of resistance both to acids and penicillinase. The resistance to acid agents is illustrated in the following table where the percentage of penicillin undegraded by N/10 HCl at 25°C over different periods of time is reported;

| PRODUCT | 0 min. | 30 min. | 60 min. |
|---|---|---|---|
| Penicillin G sodium salt | 100 | 2 | — |
| Penicillin V | 100 | 89 | 75 |
| dl-α-hydrazinobenzylpenicillin | 100 | 98 | 96 |
| dl-α-(1-methylhydrazinobenzyl) penicillin | 100 | 94 | 90 |

The Minimum Inhibiting Concentrations (MIC) in vitro of the new penicillins expressed in Γ/ml were evaluated on some pathogenic microorganisms in comparison to a commercially known wide-spectrum penicillin, α-D(−)-aminobenzylpenicillin. These data are listed in the following table.

| | MIC μg/ml | | |
|---|---|---|---|
| | dl-α-hydrazino-benzyl penicillin | dl-α-(1-methyl-benzyl hy-drazino) penicillin | α-D(-) amino-benzyl penicillin |
| Staphylococcus aureus penicillin-sensitive | 0.01 | 0.02 | 0.05 |
| Staphylococcus aureus penicillin-resistant | 0.05 | 0.4 | 1.6 |
| Streptococcus pyogenes B haemolyticus | 0.01 | 0.01 | 0.02 |
| Streptococcus pyogenes | 0.01 | 0.02 | 0.02 |
| Diplococcus pneumoniae | 0.02 | 0.04 | 0.08 |
| Escherichia Coli 1 | 0.8 | 0.8 | 1.6 |
| Escherichia Coli 2 | 0.8 | 1.6 | 3.1 |
| Proteus mirabilis ATCC 9921 | 1.6 | 1.6 | 3.1 |
| Proteus vulgaris | 12.5 | 25 | 50 |
| Pseudomonas aeruginosa ATCC 9027 | 25 | 50 | 50 |
| Klebsiella pneumoniae ATCC 10031 | 0.8 | 1.6 | 3.1 |
| Salmonella typhimurium ATCC 2727 | 0.8 | 0.8 | 3.1 |
| Salmonella typhi | 0.4 | 0.8 | 3.1 |
| Salmonella paratyphi B | 0.8 | 0.8 | 3.1 |
| Shigella sonnei | 3.1 | 6.2 | 12.5 |
| Shigella dysenteriae MCTL | 0.4 | 0.8 | 3.1 |

The new penicillins of the present invention possess the manifold advantages of displaying a broad-spectrum antibacterial activity, of being scarcely sensitive to penicillinase and resistant to the attack of acid agents. Thus, the new penicillins may be favorably compared with products heretofore used in treating infections due to Gram-positive and Gram-negative bacteria.

I claim:
1. α-Hydrazinobenzylpenicillins of the formula:

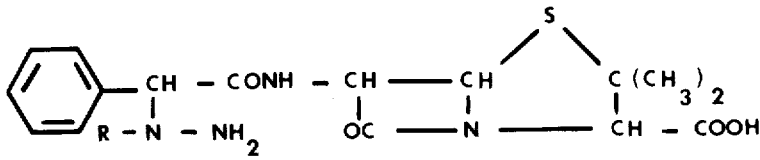

wherein R is hydrogen or an alkyl group having from 1 to 6 carbon atoms, in the form of either racemates or enantiomers; non-toxic salts thereof with an alkali or alkaline-earth metal cation, ammonium ion, or the cation of a non-toxic pharmaceutically acceptable amine; and non-toxic acid addition salts thereof with an inorganic acid selected from the group consisting of hydrochloric, hydrobromic, hydroiodic, sulfuric and phosphoric acids; or an organic acid selected from the group consisting of acetic, succinic, maleic, citric, benzoic, tartaric and ascorbic acids.

2. 6-(D,L-α-Hydrazinophenylacetamido)-penicillanic acid, its enantiomers; non-toxic salts thereof with an alkali or alkaline-earth metal cation, ammonium ion, or the cation of a non-toxic pharmaceutically acceptable amine; and non-toxic acid addition salts thereof with an inorganic acid selected from the group consisting of hydrochloric, hydrobromic, hydroiodic, sulfuric and phosphoric acids; or an organic acid selected from the group consisting of acetic, succinic, maleic, citric, benzoic, tartaric and ascorbic acids.

3. 6-(D,L-α-(1-Methylhydrazino)phenylacetamido)-penicillanic acid, its enantiomers; non-toxic salts thereof with an alkali or alkaline-earth metal cation, ammonium ion, or the cation of a non-toxic pharmaceutically acceptable amine; and non-toxic acid addition salts thereof with an inorganic acid selected from the group consisting of hydrochloric, hydrobromic, hydroiodic, sulfuric and phosphoric acids; or an organic acid selected from the group consisting of acetic, succinic, maleic, citric, benzoic, tartaric and ascorbic acids.

4. 6-(D,L-α-(1-Ethylhydrazino)-phenylacetamido)-penicillanic acid, its enantiomers; non-toxic salts thereof with an alkali or alkaline-earth metal cation, ammonium ion, or the cation of a non-toxic pharmaceutically acceptable amine; and non-toxic acid addition salts thereof with an inorganic acid selected from the group consisting of hydrochloric, hydrobromic, hydroiodic, sulfuric and phosphoric acids; or an organic acid selected from the group consisting of acetic, succinic, maleic, citric, benzoic, tartaric and ascorbic acids.

5. 6-(D,L-α-(1-n-Propylhydrazino)-phenylacetamido)-penicillanic acid, its enantiomers; non-toxic salts thereof with an alkali or alkaline-earth metal cation, ammonium ion, or the cation of a non-toxic pharmaceutically acceptable amine; and non-toxic acid addition salts thereof with an inorganic acid selected from the group consisting of hydrochloric, hydrobromic, hydroiodic, sulfuric and phosphoric acids; or an organic acid selected from the group consisting of acetic, succinic, maleic, citric, benzoic, tartaric and ascorbic acids.

6. 6-[D,L-α-(1-n-Pentylhydrazino)-phenylacetamido]-penicillanic acid.

7. 6-(R(−)-α-Hydrazinophenylacetamido)penicillanic acid.

8. 6-(S(+)-α-Hydrazinophenylacetamido)penicillanic acid.

9. An α-hydrazinobenzylpenicillin as claimed in claim 1, wherein the alkali metal is sodium or potassium.

10. An α-hydrazinobenzylpenicillin as claimed in claim 1, wherein the alkaline earth metal is calcium.

11. An α-hydrazinobenzylpenicillin as claimed in claim 1, wherein the amine is triethylamine, procaine, dibenzylamine or N,N'-dibenzylethylendiamine.

* * * * *

UNITED STATES PATENT OFFICE
CERTIFICATE OF CORRECTION

Patent No. 3,928,325  Dated December 23, 1975

Inventor(s) GIORGIO PIFFERI  Page 1 of 2

It is certified that error appears in the above-identified patent and that said Letters Patent are hereby corrected as shown below:

Title page, left side, in Foreign Application Priority Data: "31558/72" and "24127/72" should read -- 31558-A/72 -- and -- 24127-A/73 --.

Title page, right side, the formula in the Abstract"

"  "  should read:

-- 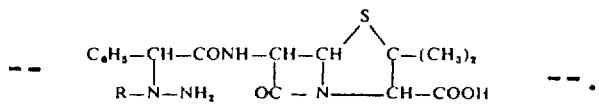 --.

Column 1, after the first formula insert -- (I) --.

Column 2, line 35: "6-APA a mixed" should read -- 6-APA through a mixed --.

PO-1050
(5/69)

UNITED STATES PATENT OFFICE
CERTIFICATE OF CORRECTION

Patent No. 3,928,325                      Dated   December 23, 1975

Inventor(s)  GIORGIO PIFFERI                              Page 2 of 2

It is certified that error appears in the above-identified patent and that said Letters Patent are hereby corrected as shown below:

Column 4, lines 30-31: "(with dec.) obtained melting at 217°-220°C (with dec.)." should read -- (with dec.). --; line 53: "under" should read -- in --.

Column 7, line 48: "ethylexanoate" should read -- ethyl-hexanoate --; line 67: "acid when" should read -- acid which when --.

Column 8, line 26: "g of chloride of the acid" should read -- g of the acid chloride of --; line 47: "6-R(-)-α-hydrazinobenzylacetamido" should read -- 6-(R(-)-α-hydrazinophenylacetamido) --; line 60: "40°C, the refluxed" should read -- 40°C, then refluxed --.

Signed and Sealed this

Twenty-seventh Day of July 1976

[SEAL]

Attest:

RUTH C. MASON
Attesting Officer

C. MARSHALL DANN
Commissioner of Patents and Trademarks